F. E. CARLSON.
SUPPORT AND SPACER FOR VACUUM BOTTLES.
APPLICATION FILED AUG. 7, 1913.
1,116,993.
Patented Nov. 10, 1914.
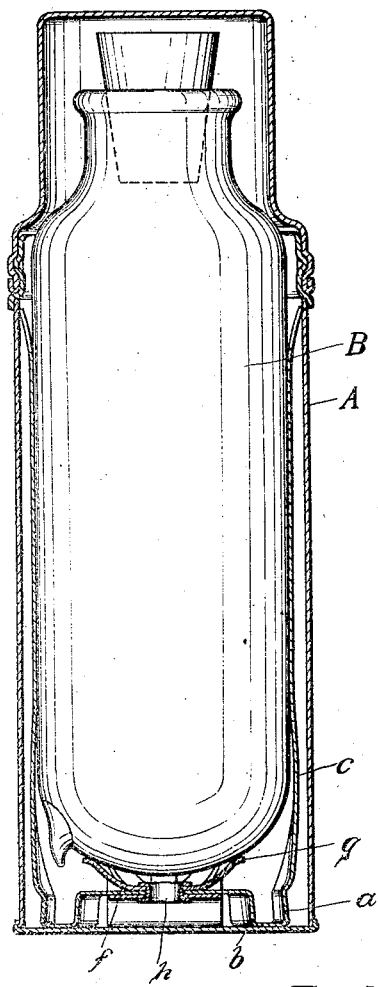
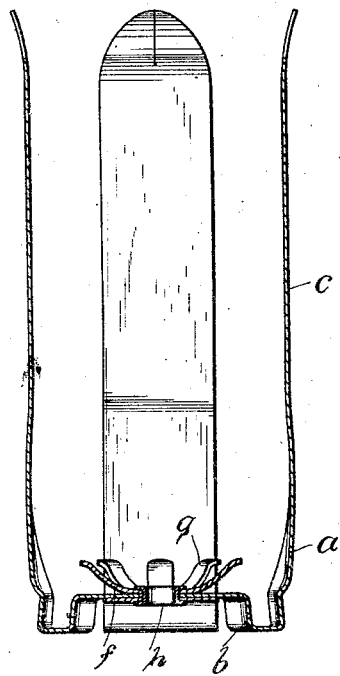
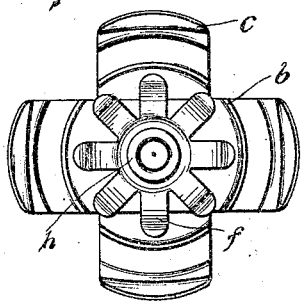
WITNESSES:
INVENTOR.
Frederick E. Carlson:
BY
his ATTORNEY.

UNITED STATES PATENT OFFICE.

FREDERICK E. CARLSON, OF NEW BRITAIN, CONNECTICUT, ASSIGNOR TO LANDERS, FRARY & CLARK, OF NEW BRITAIN, CONNECTICUT, A CORPORATION OF CONNECTICUT.

SUPPORT AND SPACER FOR VACUUM-BOTTLES.

1,116,993. Specification of Letters Patent. Patented Nov. 10, 1914.

Application filed August 7, 1913. Serial No. 783,476.

*To all whom it may concern:*

Be it known that I, FREDERICK E. CARLSON, a citizen of the United States, and a resident of New Britain, in the county of Hartford, State of Connecticut, have invented certain new and useful Improvements in Supports and Spacers for Vacuum-Bottles, of which the following is a specification.

The object of this invention is to produce an inexpensive and efficient support and spacer for a glass vacuum bottle within an inclosing casing.

In the drawings,—Figure 1 is a central vertical section illustrating my invention, the bottle being shown in side elevation. Fig. 2 is a sectional side view of the support and spacer. Fig. 3 is a plan view thereof.

In the drawings A denotes the case and B the bottle.

A device made in accordance with my invention comprises two similarly shaped members, each of which is formed from a single strip of sheet metal bent to provide a base $a$, feet $b$, and upstanding arms $c$ longitudinally curved. These two members are arranged at right angles to one another with the base of one overlapping the base of the other, and a holder $f$ having radial upwardly curved spring fingers $g$ is located on the base. The three parts are connected together at the center in any convenient manner, as by an eyelet $h$. The bottle B rests on the spring fingers of the holder, and the upstanding arms $c$ are interposed between the sides of the bottle and the case A, and owing to their longitudinal curvature constitute a resilient support at the sides of the bottle, spacing it from the walls of the case. The feet $b$ are slightly resilient, and endwise pressure on the bottle is first received by the spring fingers of the holder and by them communicated to the center of the base, the resiliency of the metal causing the feet at the ends of the base portions to yield, thus providing a double cushion. The upstanding arms $c$ bearing at their upper ends against the wall of the casing prevent any injurious lateral shifting of the bottle within the casing. These devices are extremely efficient in providing a complete protection for the bottle, and they are extremely inexpensive to manufacture and assemble.

I claim as my invention:—

1. The combination with a vacuum bottle and its casing, of a combined support and spacer comprising a pair of similarly shaped members, each of which has a resilient base part, feet, and upstanding side arms bearing at their upper ends against the walls of the casing, all formed from a single piece of metal, said members being angularly disposed with their bases overlapping, and means for securing them together centrally of the bases.

2. The combination with a vacuum bottle and its casing, of a combined support and spacer comprising a pair of similarly shaped members, each of which has a resilient base part, feet, and upstanding side arms bearing at their upper ends against the walls of the casing, all formed from a single piece of metal, said members being angularly disposed with their bases overlapping, a holder mounted above the bases of said members, and means for securing said holder and bases together.

3. The combination with a vacuum bottle and its casing, of a combined support and spacer comprising a pair of similarly shaped members, each of which has a base part, feet, and upstanding side arms bearing at their upper ends against the walls of the casing, all formed from a single piece of metal, said members being angularly disposed with their bases overlapping, a holder provided with radial spring fingers mounted above the bases of said members, and means for securing said holder and bases together centrally of the latter.

FREDERICK E. CARLSON.

Witnesses:
WALTER M. PAYSON,
DAVID MODEEN.